Aug. 5, 1958  H. H. HILTON  2,846,624
ELECTROLYTIC CAPACITOR
Filed March 24, 1954
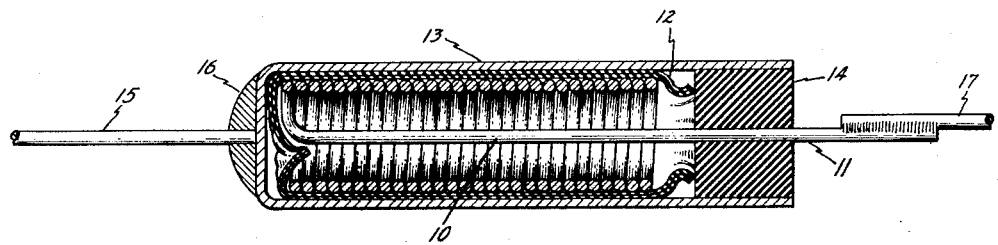
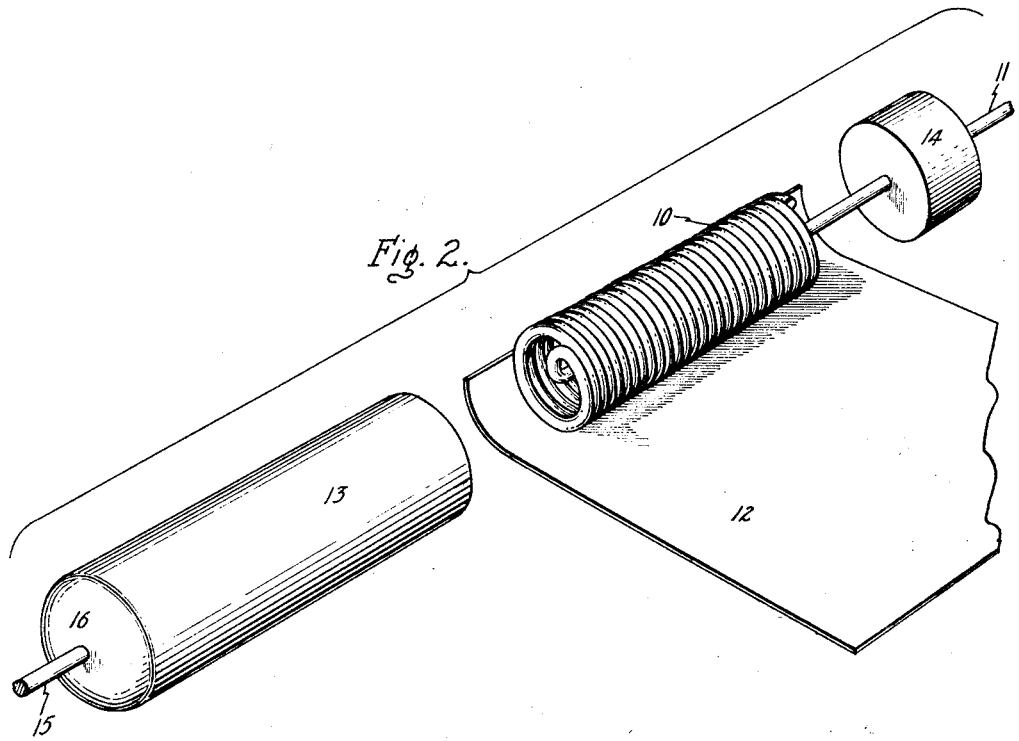
Inventor
Harry H. Hilton,
by Gilbert P. Tarleton
His Attorney.

United States Patent Office 2,846,624
Patented Aug. 5, 1958

2,846,624

ELECTROLYTIC CAPACITOR

Harry H. Hilton, Glens Falls, N. Y., assignor to General Electric Company, a corporation of New York Application March 24, 1954, Serial No. 418,315

5 Claims. (Cl. 317—230)

This invention relates to an electrolytic capacitor. More particularly, the invention relates to an electrolytic capacitor having a tantalum armature or electrode.

It is an object of the present invention to provide an improved electrolytic capacitor which may be readily fabricated into units of small size.

It is another object of the invention to provide a method of fabricating an electrolytic capacitor which is easily fabricated and low in production cost.

It is a further object of the invention to produce an electrolytic capacitor in which one of the electrodes is formed of closely coiled tantalum wire or other suitable material (aluminum, etc.).

Additional objects and features of the invention will become apparent from the following detailed description and with reference to the accompanying drawing in which Fig. 1 is a sectional view of a capacitor produced in accordance with this invention and Fig. 2 is an exploded perspective view of the capacitor of Fig. 1.

Briefly stated, in accordance with one of its aspects, the invention is directed to an electrolytic capacitor comprising a first electrode consisting of an elongated coil of tantalum wire having one end extending axially outward from the coil to form a terminal, spacer material impregnated with an electrolyte surrounding the coil except for the terminal end, a second electrode consisting of a close fitting metallic cylinder open at one end in which the coil and electrolyte spacer are positioned with the terminal end of the coil extending through the open end of the cylinder, and a plug of nonconducting material sealing the open end of the cylinder with the axially extending terminal portion of the coil extending through the plug.

Referring to the drawing, one of the capacitor electrodes consists of a length of tantalum wire 10 closely coiled to give an elongated cylindrical configuration and having a terminal end 11 extending axially outward from the coil. A solderable terminal 17 is attached to the terminal 11 as by welding. It is preferred that the wire 10 have an anodic oxide film formed thereover. This dielectric film may be formed in a number of ways. For example, in Ruscetta and Torrisi application Serial No. 253,492, filed October 27, 1951, now Patent No. 2,739,110, dated March 20, 1956, and assigned to the same assignee as the present application, there is disclosed a method of forming a dielectric film on a tantalum capacitor electrode which comprises subjecting the electrode to a forming voltage while the electrode is immersed in a hot forming bath consisting of the residue obtained by heating a mixture of an ethanolamine, ethylene glycol, and ammonium borate at a temperature of at least 150° C. until all of the components of the heated mixture vaporizable below 150° C. are removed, the bath being held at a temperature above the melting point of the residue. In Bolton and Torrisi application Serial No. 405,870, filed January 25, 1954, now Patent No. 2,785,116, dated March 12, 1957, and assigned to the same assignee as the present application, there is described a further treatment to improve the tantalum electrode whereby an electrode prepared in accordance with the method of Ruscetta and Torrisi is subjected to an oxidizing atmosphere at a temperature of between 200° C. and 500° C. followed by a repetition of the original forming step.

Ruscetta and Jenny application Serial No. 507,010, filed May 9, 1955, and assigned to the same assignee as the present application, discloses a method of electrolytically etching tantalum in which the tantalum is made anode in an electrolyte solution comprising at least 6.5% by weight of methanol, from 3000 to 135,000 p. p. m. of water, and the balance a methanol soluble inorganic nonfilm producing salt dissolved in the solvent. Such organic solvents as ethylene glycol, ethyl alcohol, isopropyl alcohol, nitrobenzene, glycerine, diethylene glycol monoethyl ether, and formamide were set forth as satisfactory substitutes for the mehanol, and alkali halides as well as ammonium halides as well as thiocyanates, nitrates, and similar materials, were described as satisfactory salts.

While etching treatments impart improved qualities to the wire 10 of this invention, it is emphasized that no etching treatment is necessary in order to produce a capacitor in accordance with this invention. The wire 10 may be of very small gauge. For example, the wire diameter may be of the order 0.01 inch and the coil diameter may be of the order of 0.1 inch.

The coil formed by the wire 10 is wrapped in a spacer 12 of nonconducting material such as paper or other porous nonconducting material. The spacer 12 is impregnated with an electrolyte of a type well known to those skilled in the art. For example, an electrolyte which has been frequently used in an aqueous solution of boric acid and sodium borate. A satisfactory electrolyte recently developed is disclosed in Jenny and Stephenson application Serial No. 354,043, filed May 11, 1953, now Patent No. 2,749,487, dated June 5, 1956, which is assigned to the same assignee as the present application. This application was directed to an electrolyte consisting of a solution of potassium nitrite in a mixture of water and ethylene glycol in such proportions that the freezing point of the mixture was below −55° C.

The enwrapped coil is placed in a close-fitting cylinder or can 13 which may be composed of tantalum but is normally composed of a less expensive metal such as copper, silver, aluminum, lead, tin, or an alloy. The open end of the cylinder or can 13 is sealed by means of a plug 14 of the nonconducting material such as rubber or other plastic substance through which the terminal 11 of the electrode coil extends. If desired, the seal formed by the plug 14 may be made more secure by crimping the outside of the cylinder 13 against the plug. While it is not a necessary element, a second terminal 15 may be affixed at the closed end of the can or cylinder 13 as by a solder connection 16.

The capacitor of this invention can withstand considerable abuse since there are no thin foil parts to shake loose from the terminals during rough usage. Thirty-eight turns of 0.010 inch diameter tantalum wire formed into a coil 0.1 inch in diameter produced a capacitor having rating of 8 mfd. (more or less, depending on the degree of etch) at 25 volts when etched and 0.8 mfd. at 25 volts when not etched. These capacitors may be constructed with voltage ratings 0–600 volts. Thus it may be seen that the capacitor of the present invention provides good capacitance in small size even at −55° C. Such capacitors are useful in hearing aids and similar apparatus.

While the present invention has been described with reference to particular embodiments thereof, it will be understood that numerous modifications may be made by those skilled in the art without actually departing from the invention. Therefore, I aim in the appended claims

What I claim as new and desire to secure by Letters Patent of the United States is:

1. An electrolytic capacitor comprising a first electrode consisting of an elongated coil of wire, one end of said wire extending outward from said coil to form a terminal, spacer material impregnated with an electrolyte wrapped around said coil except for the terminal end, a second electrode consisting of a close-fitting metallic container open at one end in which said coil and spacer are positioned with the spacer separating said coil from the sides and bottom of said container and with the terminal end of said coil extending through the open end of said container, and a plug of nonconducting resilient material sealing the open end of said container, said coil terminal extending through said plug.

2. An electrolytic capacitor as claimed in claim 1 wherein the coil of wire has an etched surface.

3. An electrolytic capacitor as claimed in claim 1 wherein the metallic container comprising the second electrode is provided with a terminal wire extending outward from the end opposite the end through which the coil terminal wire extends.

4. The method of making a tantalum capacitor which comprises coiling a tantalum wire into an elongated coil of closely spaced turns leaving one end of said wire extending axially outward from one end of said coil, wrapping a spacer impregnated with electrolyte around the sides and the other end of said coil, encasing said coil and spacer in a close-fitting metallic container open at only one end with the axially extending portion of said wire coil extending through the open end of said container and with the spacer separating said coil from the sides and bottom of said container, and sealing the open end of the cylinder with a plug of nonconducting resilient material through which the axially extending portion of said wire coil extends.

5. The method of claim 4 wherein the tantalum wire is etched to provide an extended surface for an oxide coating.

References Cited in the file of this patent

UNITED STATES PATENTS

| | | |
|---|---|---|
| 2,010,758 | Grimditch | Aug. 6, 1935 |
| 2,042,044 | Garstang | May 26, 1936 |
| 2,066,912 | Ruben | Jan. 5, 1937 |
| 2,119,628 | Robinson et al. | June 7, 1938 |
| 2,243,814 | Dubilier | May 27, 1941 |